(12) United States Patent
Nair et al.

(10) Patent No.: US 12,147,733 B2
(45) Date of Patent: *Nov. 19, 2024

(54) PROVIDING AUDIO INFORMATION WITH A DIGITAL ASSISTANT

(71) Applicant: Apple Inc., Cupertino, CA (US)

(72) Inventors: Rahul Nair, Hayward, CA (US); Golnaz Abdollahian, San Francisco, CA (US); Avi Bar-Zeev, Oakland, CA (US); Niranjan Manjunath, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,485

(22) Filed: Nov. 14, 2023

(65) Prior Publication Data

US 2024/0086147 A1 Mar. 14, 2024

Related U.S. Application Data

(63) Continuation of application No. 18/123,886, filed on Mar. 20, 2023, now Pat. No. 11,861,265, which is a
(Continued)

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/011* (2013.01); *G06F 3/165* (2013.01); *G10L 15/22* (2013.01);
(Continued)

(58) Field of Classification Search
CPC .......... G06F 3/167; G06F 3/011; G06F 3/165; G10L 15/22; G10L 2015/227; H04R 1/406
See application file for complete search history.

(56) References Cited

U.S. PATENT DOCUMENTS 9,646,628 B1 5/2017 Carlson et al.
9,877,100 B1 * 1/2018 Tyagi ..................... G10L 15/22
(Continued)

FOREIGN PATENT DOCUMENTS

CN 1780374 A 5/2006
CN 104932679 A 9/2015
(Continued)

OTHER PUBLICATIONS

Notice of Allowance received for Korean Patent Application No. 10-2023-7001029, mailed on Dec. 26, 2023, 7 pages (2 pages of English Translation and 5 pages of Official Copy).
(Continued)

*Primary Examiner* — Mohammad K Islam
(74) *Attorney, Agent, or Firm* — DLA Piper LLP (US)

(57) ABSTRACT

In an exemplary technique, audio information responsive to received input is provided. While providing the audio information, one or more conditions for stopping the provision of audio information are detected, and in response, the provision of the audio information is stopped. After stopping the provision of the audio information, if the one or more conditions for stopping the provision of audio information have ceased, then resumed audio information is provided, where the resumed audio information includes a rephrased version of a previously provided segment of the audio information.

33 Claims, 5 Drawing Sheets

Related U.S. Application Data continuation of application No. 17/056,126, filed as application No. PCT/US2019/028976 on Apr. 24, 2019, now Pat. No. 11,609,739.

(60) Provisional application No. 62/679,644, filed on Jun. 1, 2018.

(51) Int. Cl.
   *G10L 15/22* (2006.01)
   *H04R 1/40* (2006.01)

(52) U.S. Cl.
   CPC ........ *G10L 2015/227* (2013.01); *H04R 1/406* (2013.01)

(56) References Cited

U.S. PATENT DOCUMENTS

| | | | |
|---|---|---|---|
| 2005/0191971 | A1 | 9/2005 | Boone et al. |
| 2012/0072936 | A1 | 3/2012 | Small et al. |
| 2012/0310391 | A1* | 12/2012 | Sanders ............... G06F 3/017 700/94 |
| 2013/0033643 | A1 | 2/2013 | Kim et al. |
| 2014/0270200 | A1* | 9/2014 | Usher ................... G10L 25/78 381/74 |
| 2015/0109191 | A1 | 4/2015 | Johnson et al. |
| 2015/0268721 | A1 | 9/2015 | Joo |
| 2015/0280670 | A1* | 10/2015 | Kauffmann ......... G10L 21/0316 381/107 |
| 2015/0348551 | A1 | 12/2015 | Gruber et al. |
| 2016/0248899 | A1 | 8/2016 | Lee et al. |
| 2017/0318374 | A1* | 11/2017 | Dolenc ................ H04R 29/004 |
| 2017/0345429 | A1* | 11/2017 | Hardee .................. G10L 25/93 |
| 2019/0180733 | A1 | 6/2019 | Saito et al. |
| 2020/0117287 | A1* | 4/2020 | Yaron ..................... G06F 3/167 |
| 2021/0224031 | A1 | 7/2021 | Nair et al. |
| 2023/0229387 | A1 | 7/2023 | Nair et al. |

FOREIGN PATENT DOCUMENTS

| | | | | |
|---|---|---|---|---|
| CN | 111684820 | A * | 9/2020 | ............... G08B 7/06 |
| EP | 2728834 | A1 | 5/2014 | |
| EP | 2760015 | A1 * | 7/2014 | ............... G06F 3/167 |
| EP | 3188495 | A1 * | 7/2017 | ....... G10K 11/17821 |
| JP | 8-322796 | A | 12/1996 | |
| JP | 2017-90611 | A | 5/2017 | |
| KR | 10-2015-0104615 | A | 9/2015 | |
| KR | 10-2015-0112337 | A | 10/2015 | |
| KR | 10-2016-0071732 | A | 6/2016 | |
| KR | 10-2017-0100067 | A | 9/2017 | |
| KR | 10-2017-0131465 | A | 11/2017 | |
| KR | 10-2018-0032632 | A | 3/2018 | |
| TW | I241828 | B * | 2/2004 | ............... G06F 3/011 |
| WO | 2013/170383 | A1 | 11/2013 | |
| WO | 2014/124332 | A2 | 8/2014 | |
| WO | 2017/044160 | A1 | 3/2017 | |
| WO | 2017/044257 | A1 | 3/2017 | |
| WO | 2018/043112 | A1 | 3/2018 | |
| WO | WO-2020251902 | A1 * | 12/2020 | ............. G06F 3/165 |

OTHER PUBLICATIONS

Office Action received for Chinese Patent Application No. 201980033654.5, mailed on Oct. 19, 2023, 21 pages (7 pages of English Translation and 14 pages of Official Copy).
Applicant-Initiated Interview Summary received for U.S. Appl. No. 17/056,126, mailed on Oct. 18, 2022, 3 pages.
Corrected Notice of Allowance received for U.S. Appl. No. 17/056,126, mailed on Dec. 7, 2022, 2 pages.
Corrected Notice of Allowance received for U.S. Appl. No. 18/123,886, mailed on Aug. 9, 2023, 2 pages.
International Preliminary Report on Patentability received for PCT Patent Application No. PCT /US2019/028976, mailed on Dec. 10, 2020, 12 pages.
International Search Report and Written Opinion received for PCT Patent Application No. PCT /US2019/028976, mailed on Nov. 11, 2019, 17 pages.
Invitation to Pay Additional Fees and Partial International Search Report received for PCT Patent Application No. PCT /US2019/028976, mailed on Sep. 16, 2019, 10 pages.
Non-Final Office Action received for U.S. Appl. No. 17/056,126, mailed on Aug. 4, 2022, 23 pages.
Notice of Acceptance received for Australian Patent Application No. 2019279597, mailed on Nov. 3, 2021, 3 pages.
Notice of Allowance received for U.S. Appl. No. 17/056,126, mailed on Nov. 30, 2022, 8 pages.
Notice of Allowance received for U.S. Appl. No. 18/123,886, mailed on Jul. 19, 2023, 10 pages.
Notice of Allowance received for U.S. Appl. No. 18/123,886, mailed on Sep. 7, 2023, 10 pages.
Office Action received for Australian Patent Application No. 2019279597, mailed on Jun. 2, 2021, 3 pages.
Office Action received for European Patent Application No. 19729898.7, mailed on Jul. 25, 2022, 7 pages.
Office Action received for Korean Patent Application No. 10-2020-7034292, mailed on Apr. 17, 2022, 11 pages.
Notice of Acceptance received for Australian Patent Application No. 2022201037, mailed on May 11, 2023, 3 pages.
Notice of Allowance received for Korean Patent Application No. 10-2020-7034292, mailed on Oct. 27, 2022, 7 pages (2 pages of English Translation and 5 pages of Official Copy).
Office Action received for Australian Patent Application No. 2022201037, mailed on Feb. 17, 2023, 5 pages.
Office Action received for Korean Patent Application No. 10-2023-7001029, mailed on Jun. 14, 2023, 10 pages (5 pages of English Translation and 5 pages of Official Copy).

* cited by examiner

PROVIDING AUDIO INFORMATION WITH A DIGITAL ASSISTANT

CROSS REFERENCE TO RELATED APPLICATION

This application is a continuation of U.S. patent application Ser. No. 18/123,886, entitled "Providing Audio Information with a Digital Assistant," filed Mar. 20, 2023, which is a continuation of U.S. patent application Ser. No. 17/056,126, entitled "Providing Audio Information with a Digital Assistant," filed Nov. 17, 2020, now U.S. Pat. No. 11,609,739, which is a U.S. National Stage Patent Application of PCT/US2019/028976, filed Apr. 24, 2019, entitled "Providing Audio Information with a Digital Assistant," which claims priority to U.S. Provisional Application No. 62/679,644, filed Jun. 1, 2018, entitled "Providing Audio Information with a Digital Assistant," each of which are hereby incorporated by reference in their entireties for all proper purposes.

BACKGROUND

1. Field

The present disclosure relates generally to an electronic device implementing a digital assistant, and more specifically to the electronic device providing audio information with the digital assistant.

2. Description of Related Art

A digital assistant interprets natural language input in spoken and/or textual form and determines a user request based on the input. The digital assistant then performs actions based on the user request. The actions include providing information and/or performing tasks responsive to the user request.

BRIEF SUMMARY

The present disclosure describes techniques for providing audio information with an electronic device implementing a digital assistant. According to some embodiments, the electronic device stops providing the audio information in response to certain types of interruption. In addition, according to some embodiments, the electronic device waits to provide (or resume providing) the audio information until the audio information is not expected to be interrupted. These techniques provide a more natural and efficient interaction with the digital assistant by, in some exemplary embodiments, allowing a user to speak without being interrupted or distracted by audio information from the digital assistant. The techniques can be applied to electronic devices such as desktop computers, laptops, tablets, televisions, speakers, entertainment systems, and smartphones.

According to some embodiments, a technique for providing audio information includes providing, using a speaker, audio information responsive to received input; while providing the audio information, detecting an external sound; in accordance with a determination that the external sound is a communication of a first type, stopping the provision of the audio information; and in accordance with a determination that the external sound is a communication of a second type, continuing the provision of the audio information. In some embodiments, the received input includes a triggering command.

In some embodiments, the technique further includes, after stopping the provision of the audio information: detecting one or more visual characteristics associated with the communication of the first type; and detecting the communication of the first type has stopped; in response to detecting the communication of the first type has stopped, determining whether the one or more visual characteristics indicate that further communication of the first type is expected; in accordance with a determination that further communication of the first type is not expected, providing resumed audio information; and in accordance with a determination that further communication of the first type is expected, continuing to stop the provision of the audio information.

In some embodiments, the one or more visual characteristics include eye gaze, facial expression, hand gesture, or a combination thereof. In some embodiments, stopping the provision of the audio information includes fading out the audio information. In some embodiments, the technique further includes, after stopping the provision of the audio information and in accordance with a determination that the communication of the first type has stopped, providing resumed audio information. In some embodiments, the audio information is divided into predefined segments, and the resumed audio information begins with the segment where the audio information was stopped. In some embodiments, the resumed audio information includes a rephrased version of a previously provided segment of the audio information.

In some embodiments, the communication of the first type includes a directly-vocalized lexical utterance. In some embodiments, the directly-vocalized lexical utterance excludes silencing commands. In some embodiments, the technique further includes determining the external sound is a directly-vocalized lexical utterance by determining a location corresponding to a source of the external sound. In some embodiments, the location is determined with a directional microphone array.

In some embodiments, the communication of the second type includes conversational sounds. In some embodiments, the communication of the second type includes compressed audio. In some embodiments, the communication of the second type includes a lexical utterance reproduced by an electronic device. In some embodiments, the technique further includes determining the external sound is a lexical utterance reproduced by an electronic device by determining a location corresponding to a source of the external sound. In some embodiments, the location is determined with a directional microphone array.

According to some embodiments, a technique for providing audio information includes receiving speech input from a source, the speech input including one or more instructions; detecting one or more visual characteristics associated with the source of the speech input; detecting the speech input has stopped; in response to detecting the speech input has stopped, determining whether the one or more visual characteristics associated with the source indicate that further speech input from the source is expected; in accordance with a determination that further speech input from the source is not expected, providing a response to the one or more instructions; in accordance with a determination that further speech input from the source is expected, forgoing providing a response to the one or more instructions.

In some embodiments, the one or more visual characteristics include eye gaze, facial expression, hand gesture, or a combination thereof. In some embodiments, the technique further includes, in accordance with the determination that further speech input from the source is expected, forgoing providing the response to the one or more instructions for a predetermined time; and after the predetermined time and in accordance with a determination that the speech input from the source has not resumed, providing a response to the one or more instructions.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

Figure 1A:
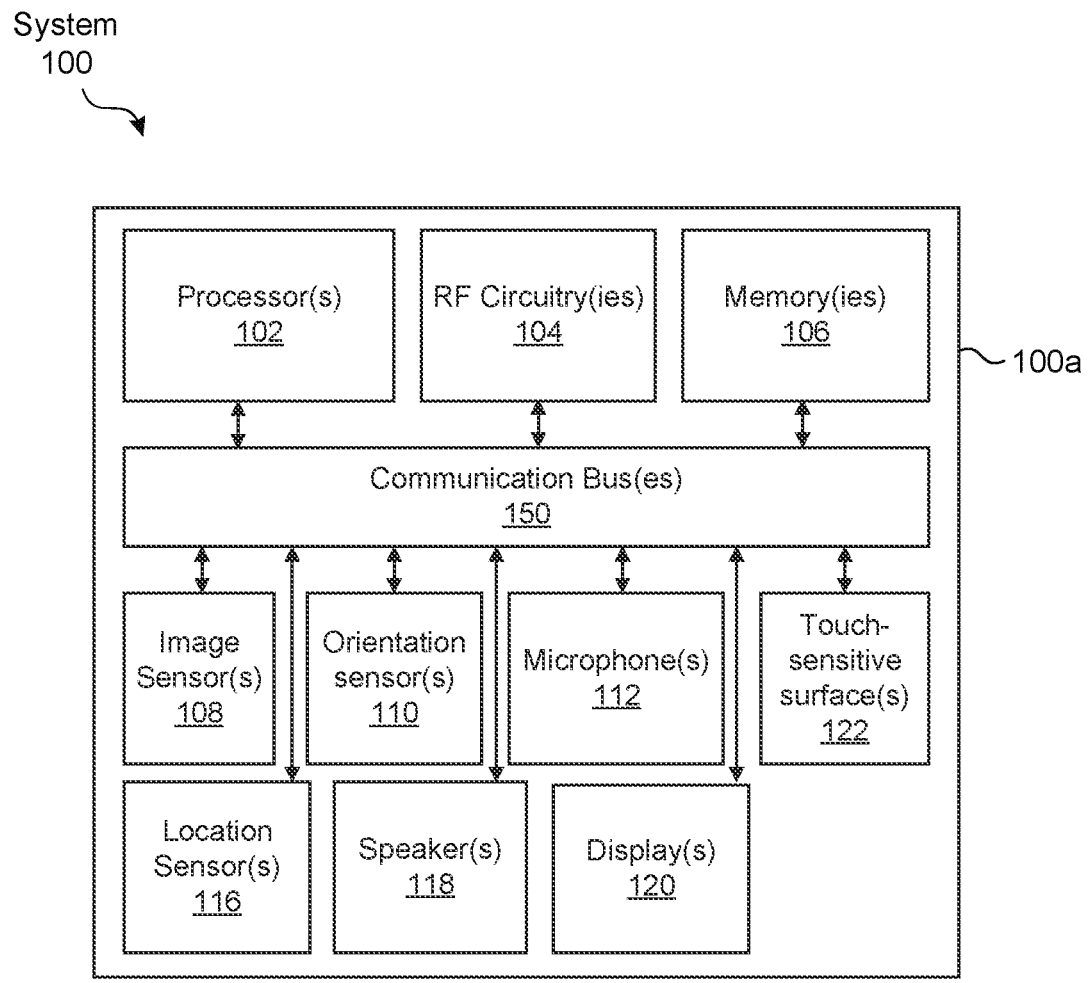
FIGS. 1A and 1B depict an exemplary system for providing audio information to a user, according to various embodiments.
Figure 1B:
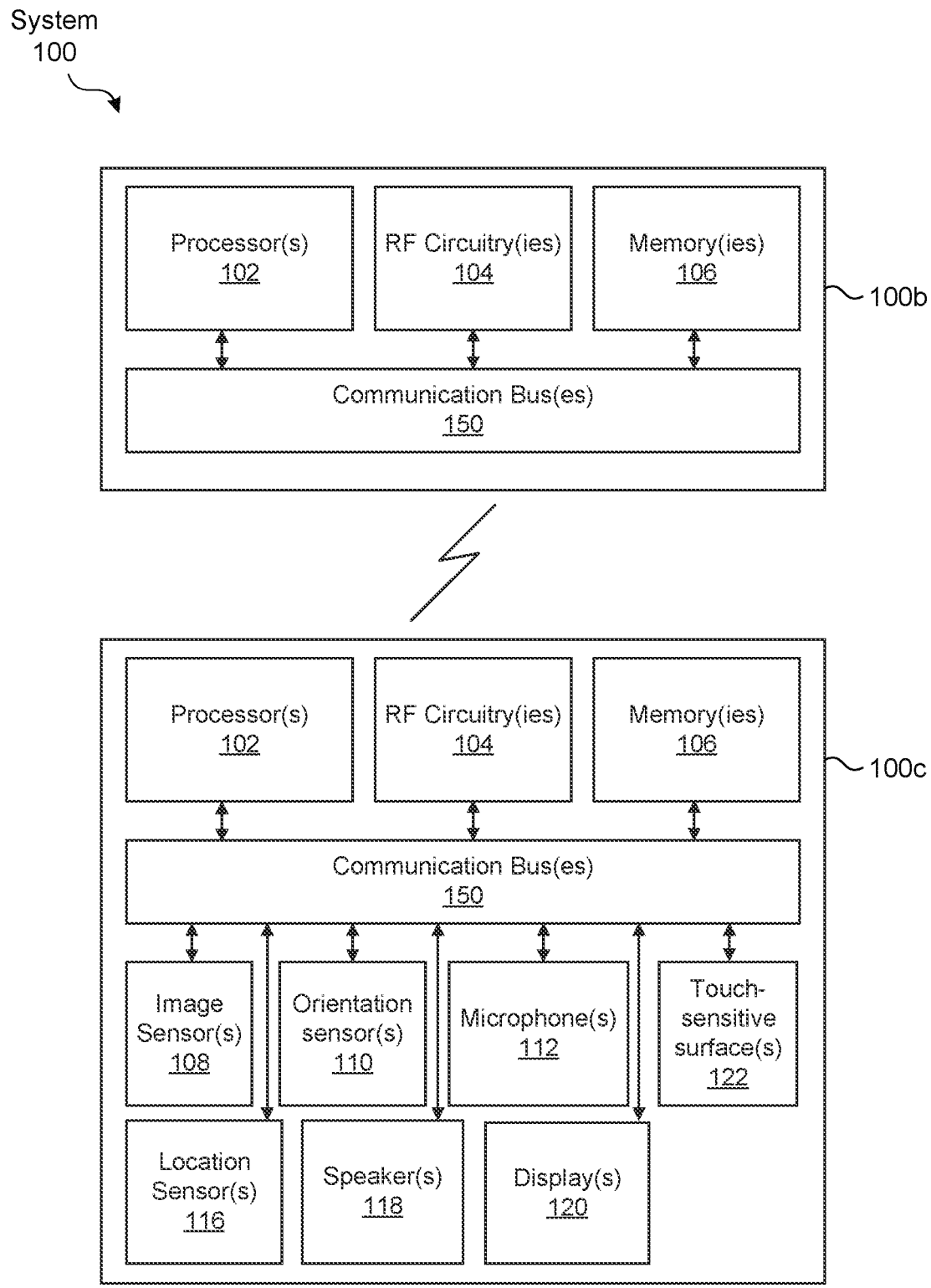

FIGS. 1A and 1B depict exemplary system 100 for providing audio information to a user, according to various embodiments.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in an auxiliary device (such as an audio playback device, television, monitor, or head-mounted display (HMD) device), where the auxiliary device is in communication with the base station device. In some embodiments, device 100a is implemented in a base station device or an auxiliary device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, memory(ies) 106. These components optionally communicate over communication bus(es) 150 of device 100b. Second device 100c (e.g., an auxiliary device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in an environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the environment. For example, system 100 uses image sensor(s) 108 to track the position and orientation of one or more objects in the environment.

In some embodiments, system 100 includes microphones(s) 112. System 100 uses microphone(s) 112 to detect sound from the user and/or the environment of the user. In some embodiments, microphone(s) 112 includes an array of microphones (including a plurality of microphones) that optionally operate in tandem, such as to identify ambient noise or to locate the source of sound in space of the environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the environment. Orientation sensor(s) 110 optionally include one or more gyroscopes and/or one or more accelerometers.

In some embodiments, system 100 implements a digital assistant. The digital assistant interprets natural language input in spoken and/or textual form and determines one or more instructions based on the input. The digital assistant then performs actions based on the instructions. In some embodiments, the actions include providing audio information and/or performing tasks responsive to the instructions. The term "digital assistant" can refer to any information processing system capable of interpreting natural language input and performing actions responsive to the input.

Typically, the natural language input requests either an informational answer or performance of a task by the digital assistant. The digital assistant responds to the input by providing requested information in an audio format and/or by performing the requested task. For example, when a user asks the digital assistant "What is the weather forecast for tomorrow?", the digital assistant may respond with the audio answer of "Tomorrow is forecast to be sunny, with a high of 75 degrees and a low of 60 degrees". As another example, when a user requests "Set an alarm for 6:00 am tomorrow", the digital assistant performs the task of setting a respective alarm and provides an audio confirmation of "An alarm has been set for 6:00 am tomorrow".

In some embodiments, visual information is provided in addition to or instead of audio information (e.g., text, video, animations, etc.). Furthermore, in some embodiments, the provided information includes media content (e.g., music or video content) and the digital assistant controls playback of the media content (e.g., starting and stopping the music or video content).

In some cases, it would be advantageous to interrupt the provision of audio information by the digital assistant. For example, if a user begins speaking to another person while the digital assistant is providing audio information, then the user may not hear the information being provided by the digital assistant. In this case, system 100 stops providing the audio information until the conversation between the user and the other person has concluded. In this way, system 100 provides audio information with the digital assistant in a more polite manner.

Furthermore, in some embodiments, before providing audio information (or resuming the provision of stopped audio information), system 100 detects visual characteristics that indicate it is appropriate for the audio information to be provided by the digital assistant. For example, when a user provides a request but stops speaking to think (e.g., "Schedule a meeting for Monday at 9:00 am with Tom and also . . . "), system 100 detects that additional speech is expected and waits to provide audio information.

Figure 2:
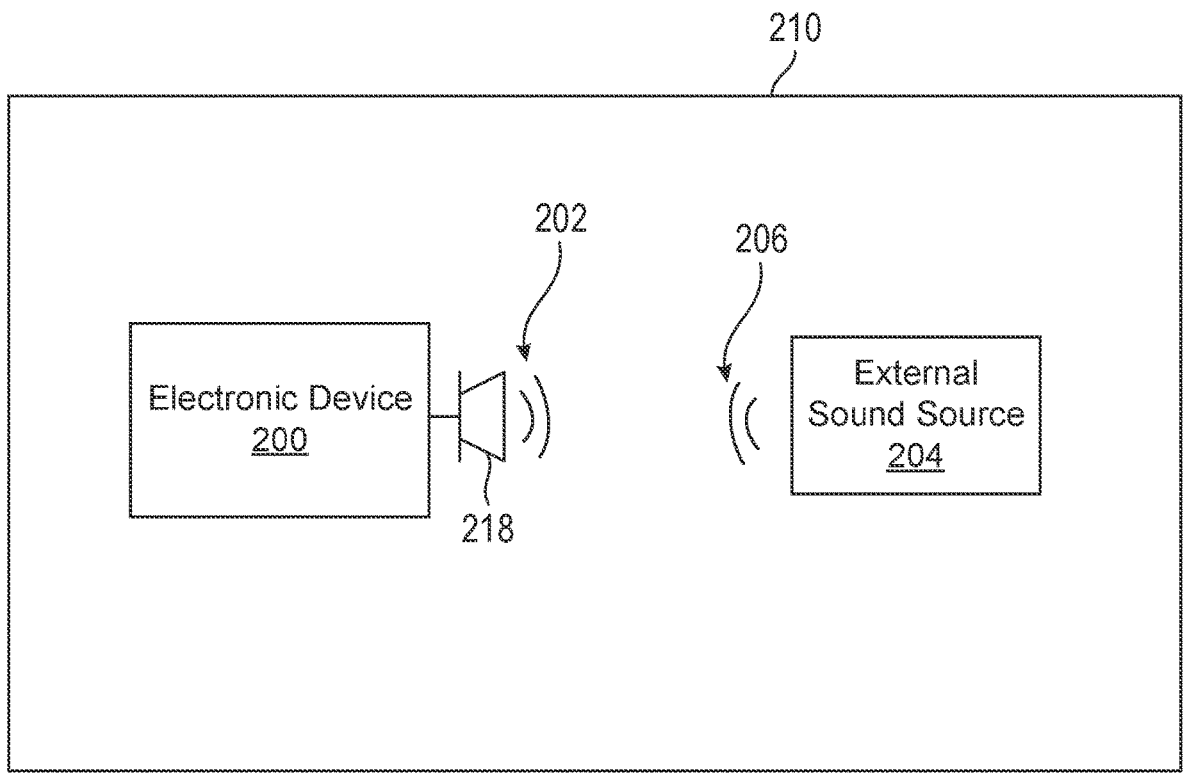
FIG. 2 depicts an example of electronic device providing audio information in an environment, according to various embodiments.

FIG. 2 depicts an example of electronic device 200 providing audio information 202 in an environment 210, according to various embodiments. In some embodiments, electronic device 200 is an embodiment of system 100, as described in reference to FIGS. 1A-1B. Audio information 202 is provided using speaker(s) 218 in response to a received input. In some embodiments, the received input is a natural language input in spoken or textual form that includes one or more instructions for a digital assistant implemented by electronic device 200. Electronic device 200 determines the one or more instructions based on the received input and provides audio information 202 based on the one or more instructions. In some embodiments, the received input includes a triggering command (e.g., "Hello Computer") that identifies the input as instructions for the digital assistant.

In some embodiments, after the input from the user has stopped, electronic device 200 determines whether visual characteristics of the user indicate that further input is expected before providing audio information 202. Examples of visual characteristics include eye gaze, facial expressions, and/or hand gestures. For example, if electronic device 200 detects a person's eyes gazing upward after they have stopped speaking, then electronic device 200 determines that further speech is expected from the person because the upward gaze indicates the person is thinking. In some embodiments, after determining that further input is expected, electronic device 200 waits for a predetermined time. If no further input is provided during the predetermined time, then electronic device 200 proceeds with providing audio information 202. If the visual characteristics of the user do not indicate that further input is expected, then electronic device 200 proceeds with providing audio information 202 after the input from the user has stopped.

If electronic device 200 detects external sound 206 from external sound source 204 while providing audio information 202, then electronic device 200 determines whether external sound 206 warrants stopping the provision of the audio information 202 based on the type of external sound 206. For some types of external sounds 206, stopping audio information 202 is unnecessary. For example, conversational sounds that indicate a person is listening or thinking, such as "hmm", "um", "okay", "uh huh", "yes", "I see", and the like, would not warrant stopping the provision of audio information 202. Other types of external sounds 206 also would not warrant stopping the provision of audio information 202, such as external sounds 206 that are compressed audio (e.g., sounds from media content such as music or video) or speech being reproduced by an electronic device (e.g., lexical utterances emitted by a television).

In some embodiments, if electronic device 200 determines that external sound 206 has characteristics consistent with compressed audio, then electronic device 200 continues providing audio information 202 (e.g., compressed audio is a type of external sound that does not warrant stopping audio information 202). In other embodiments, when electronic device 200 determines that external sound 206 has characteristics consistent with compressed audio, electronic device 200 further determines characteristics of the external sound source 204 and/or the content of the compressed audio. Based on the characteristics of the external sound source 204 emitting the compressed audio and/or the content of the compressed audio, electronic device 200 can continue providing audio information 202 or stop the audio information 202. For example, if electronic device 200 determines external sound source 204 is a television or other device emitting low-priority audio, then electronic device 200 continues providing audio information 202. Examples of low-priority audio include pre-recorded audio such as music or movies, television programs, or radio broadcasts. However, if electronic device 200 determines external sound source 204 is a telephone or other device emitting high-priority audio, then electronic device 200 can stop providing audio information 202 so as to not distract from the high-priority audio. Examples of high-priority audio include audio of a person speaking in approximately real-time (e.g., a telephone conversion), an alarm, or a warning message.

Generally, external sounds 206 of a type that convey more substantial information, are conversations between people, or otherwise include high-priority audio warrant stopping the provision of audio information 202. These types of external sounds 206 include directly-vocalized lexical utterances (e.g., external sound 206 emitted by a person speaking in the environment 210). For example, if a person begins speaking to another person in the environment 210 while audio information 202 is being provided, then electronic device 200 can stop the provision of audio information 202 upon detecting the speech. Stopping the provision of audio information 202 allows the two people to have a conversation without being distracted or interrupted by audio information 202. Similarly, a person in the environment 210 making a follow-up request to the digital assistant or otherwise conveying substantial speech would also warrant stopping the provision of audio information 202. Notably, audio information 202 is stopped without a user needing to say a silencing or triggering command, such as "stop", "quiet", "end", and the like. In some embodiments, stopping the audio information 202 includes fading out the audio information 202.

In some embodiments, electronic device 200 determines the type of external sound 206 based at least in part on a location of the external sound source 204 in the environment 210. In some embodiments, the location of the external sound source 204 is determined using a microphone array capable of detecting a direction and/or distance of a sound source. If the location of external sound source 204 corresponds to a person (and, optionally, the external sound 204 is not a conversational sound indicate the person is listening or thinking), then electronic device 200 determines that external sound 204 is substantial and stops the provision of audio information 202. However, if the location of external sound source 204 is determined to correspond to an electronic device (e.g., a television or loudspeaker), then electronic device 200 continues to provide audio information 202. In this way, electronic device 200 does not stop providing audio information 202 even when the external sound 206 being emitted by the electronic device sounds like human speech (e.g., a lexical utterance being spoken in a television program).

In some embodiments, after stopping the provision of audio information 202, electronic device 200 waits to resume the audio information 202 until an appropriate time. For example, if a person is speaking to another person in the environment 210, electronic device 200 waits to resume audio information 202 until further communication between the two people is no longer expected. In some embodiments, electronic device 200 detects that further communication is expected based on visual characteristics of one or more people making the external sounds 206, such as eye gaze, facial expressions, and/or hand gestures. For example, if electronic device 200 detects a person's eyes gazing upward after they have stopped speaking, then electronic device 200 determines that further speech is expected from the person because the upward gaze indicates the person is thinking.

Once electronic device 200 determines it is appropriate for the audio information 202 to continue, electronic device 200 provides resumed audio information 202. In some embodiments, electronic device 200 determines it is appropriate for audio information 202 to continue based on visual characteristics of one or more people, such as eye gaze, facial expressions, and/or hand gestures. For example, if system detects a person's eyes are gazing in the direction speaker(s) 218, then electronic device 200 determines that providing resumed audio information is appropriate.

In some embodiments, the audio information 202 is divided into predefined segments, and the resumed audio information begins with the segment where the audio information 202 was stopped. In this way, the resumed audio information can begin with a full phrase or word. In some embodiments, the resumed audio information includes a rephrased version of a previously provided segment of audio information 202. The rephrased version of the previously provided segment of audio information 202 reminds the listener of where the audio information 202 was stopped without repeating the same (e.g., verbatim) audio information.

Figure 3:
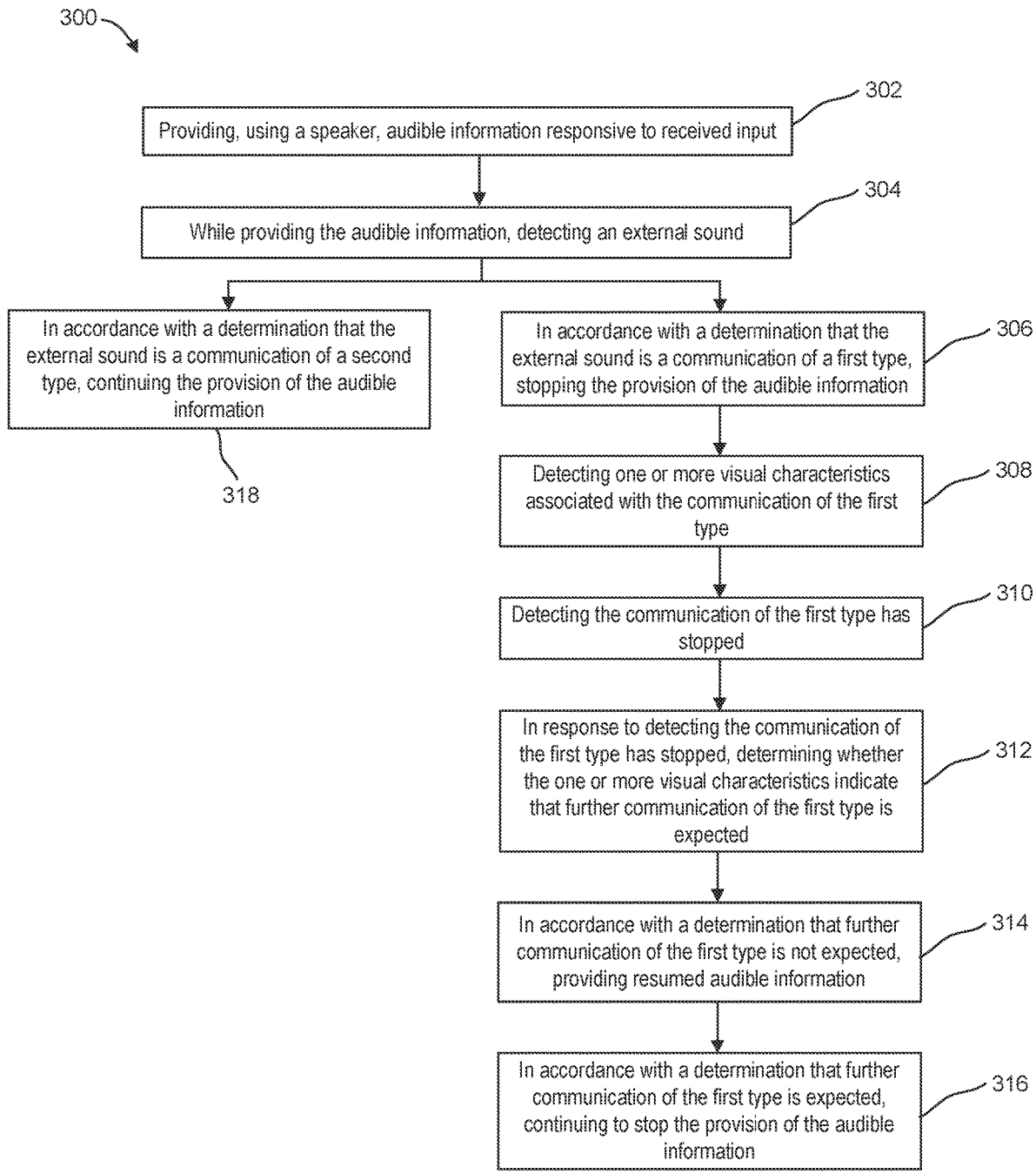
FIG. 3 depicts a flow chart of an exemplary process for providing audio information, according to various embodiments.

Turning now to FIG. 3, a flow chart of exemplary process 300 for providing audio information is depicted, according to various embodiments. Process 300 can be performed using an electronic device (e.g., 100*a*, 200). The electronic device is, for example, a desktop computer, a laptop computer, a handheld mobile device, an audio playback device, a television, a monitor, a head-mounted display (HMD) device, or a heads-up display device. It should be recognized that, in other embodiments, process 300 is performed using two or more electronic devices, such as a user device that is communicatively coupled to another device, such as a base device. In these embodiments, the operations of process 300 are distributed in any manner between the user device and the other device. Although the blocks of process 300 are depicted in a particular order in FIG. 3, it should be appreciated that these blocks can be performed in other orders. Further, one or more blocks of process 300 can be partially performed, optionally performed, combined with another block(s), and/or additional blocks can be performed.

At block 302, audio information (e.g., 202) responsive to received input is provided using a speaker (e.g., 118, 218). In some embodiments, the received input includes a triggering command.

At block 304, while providing the audio information, an external sound (e.g. 206) is detected.

At block 306, in accordance with a determination that the external sound is a communication of a first type, the provision of the audio information is stopped. In some embodiments, stopping the provision of the audio information includes fading out the audio information. In some embodiments, the communication of the first type includes a directly-vocalized lexical utterance. Optionally, the directly-vocalized lexical utterance excludes silencing commands.

In some embodiments, the external sound is determined to be a directly-vocalized lexical utterance by determining a location corresponding to a source of the external sound (e.g., 204). In some embodiments, the location corresponding to the source of the external sound is determined with a directional microphone array.

At block 308, after stopping the provision of the audio information, one or more visual characteristics associated with the communication of the first type are detected. The one or more visual characteristics include eye gaze, facial expression, hand gesture, or a combination thereof.

At block 310, the communication of the first type is detected to have stopped.

At block 312, in response to detecting the communication of the first type has stopped, a determination is made whether the one or more visual characteristics indicate that further communication of the first type is expected.

At block 314, in accordance with a determination that further communication of the first type is not expected, resumed audio information is provided. In some embodiments, the resumed audio information is provided after stopping the provision of the audio information and in accordance with a determination that the communication of the first type has stopped. In some embodiments, the audio information is divided into predefined segments, and the resumed audio information begins with the segment where the audio information was stopped. In some embodiments, the resumed audio information includes a rephrased version of a previously provided segment of the audio information.

At block 316, in accordance with a determination that further communication of the first type is expected, the provision of the audio information continues to be stopped.

At block 318, in accordance with a determination that the external sound is a communication of a second type, the provision of the audio information is continued. In some embodiments, the communication of the second type includes conversational sounds (e.g., sounds that indicate a person is listening or thinking, such as "hmm", "um", "okay", "uh huh", "yes", "I see", and the like). In some embodiments, the communication of the second type includes compressed audio. In some embodiments, the communication of the second type includes a lexical utterance (e.g., speech) reproduced by an electronic device. In some embodiments, the external sound is determined to be a lexical utterance reproduced by an electronic device by determining a location corresponding to a source of the external sound (e.g., 204). In some embodiments, the location of the source of the external sound is determined with a directional microphone array.

Figure 4:
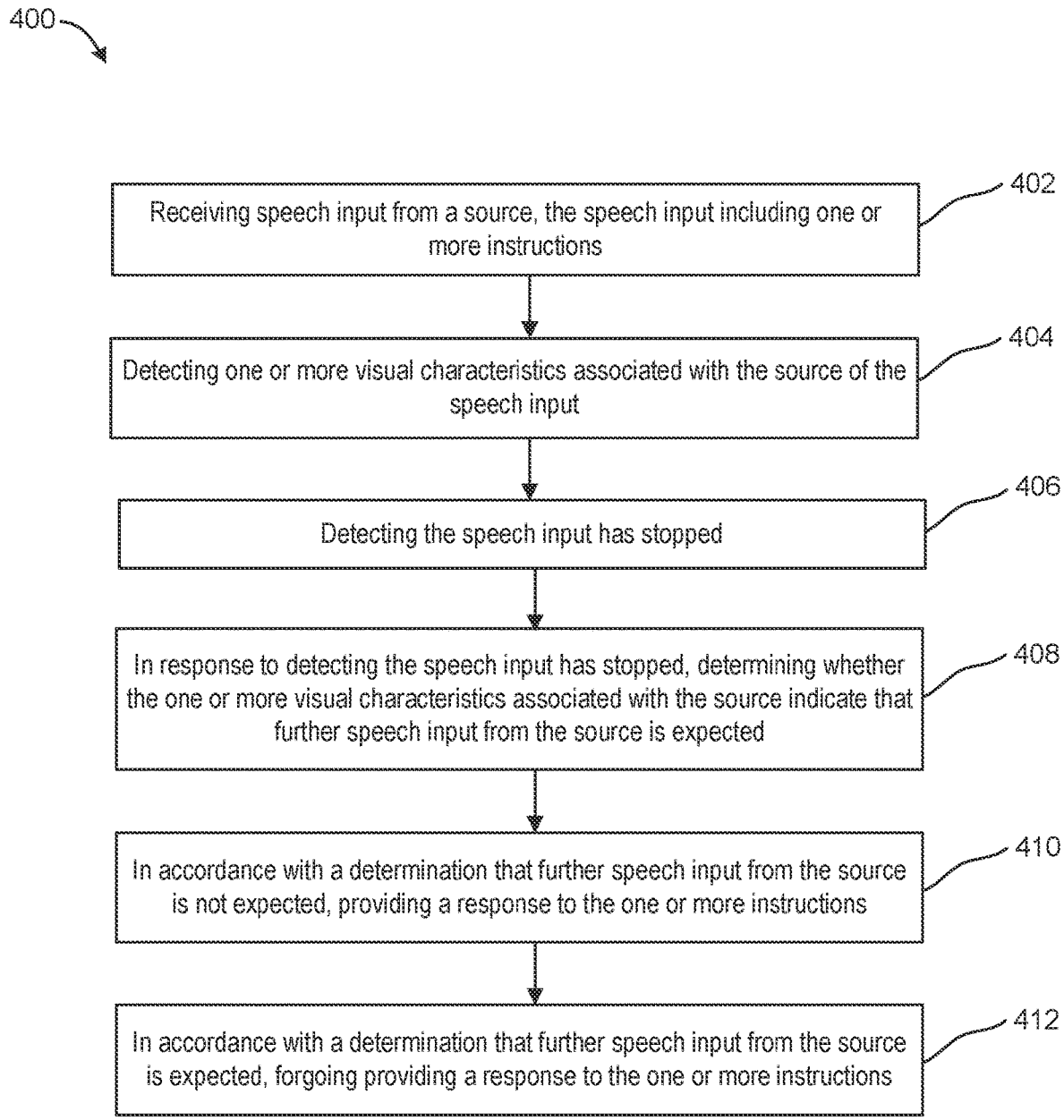
FIG. 4 depicts a flow chart of another exemplary process for providing audio information, according to various embodiments.

Turning now to FIG. 4, a flow chart of exemplary process 400 for providing audio information is depicted, according to various embodiments. Process 400 can be performed using an electronic device (e.g., 100*a*, 200). The electronic device is, for example, a desktop computer, a laptop computer, a handheld mobile device, an audio playback device, a television, a monitor, a head-mounted display (HMD) device, or a heads-up display device. It should be recognized that, in other embodiments, process 400 is performed using two or more electronic devices, such as a user device that is communicatively coupled to another device, such as a base device. In these embodiments, the operations of process 400 are distributed in any manner between the user device and the other device. Although the blocks of process 400 are depicted in a particular order in FIG. 4, it should be appreciated that these blocks can be performed in other orders. Further, one or more blocks of process 400 can be partially performed, optionally performed, combined with another block(s), and/or additional blocks can be performed.

At block 402, speech input including one or more instructions is received from a source.

At block 404, one or more visual characteristics associated with the source of the speech input are detected. The one or more visual characteristics include eye gaze, facial expression, hand gesture, or a combination thereof.

At block 406, the speech input is detected to have stopped.

At block 408, in response to detecting the speech input has stopped, a determination is made whether the one or more visual characteristics associated with the source indicate that further speech input from the source is expected.

At block 410, in accordance with a determination that further speech input from the source is not expected, a response to the one or more instructions is provided.

At block 412, in accordance with a determination that further speech input from the source is expected, a response to the one or more instructions is not provided. In some embodiments, in accordance with the determination that further speech input from the source is expected, the response to the one or more instructions is not provided for a predetermined time. After the predetermined time, and in accordance with a determination that the speech input from the source has not resumed, a response to the one or more instructions is provided.

Executable instructions for performing the features of methods 300 and/or 400 described above are, optionally, included in a transitory or non-transitory computer-readable storage medium (e.g., memory(ies) 106) or other computer program product configured for execution by one or more processors (e.g., processor(s) 102). Further, some operations in method 300 are, optionally, included in method 400 and some operations in method 400 are, optionally, included in method 300.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   one or more processors; and
   memory storing one or more programs configured to be executed by the one or more processors, the one or more programs including instructions for:
   providing, using a speaker, audio information responsive to received input, wherein the audio information is divided into segments;
   while providing the audio information, detecting one or more conditions for stopping the provision of audio information;
   in response to detecting the one or more conditions for stopping the provision of audio information, stopping the provision of the audio information; and
   after stopping the provision of the audio information and in accordance with a determination that the one or more conditions for stopping the provision of audio information have ceased, providing resumed audio information, wherein the resumed audio information includes a rephrased version of a previously provided segment of the audio information.

2. The electronic device of claim 1, wherein the one or more conditions for stopping the provision of audio information includes detecting speech from a user.

3. The electronic device of claim 2, wherein the speech from the user includes a follow-up request associated with the received input.

4. The electronic device of claim 2, wherein the speech from the user includes speech directed to another person.

5. The electronic device of claim 2, wherein the speech from the user excludes silencing commands.

6. The electronic device of claim 2, wherein the determination that the one or more conditions for stopping the provision of audio information have ceased includes a determination that one or more visual characteristics indicate that further speech from the user is not expected.

7. The electronic device of claim 6, wherein the one or more visual characteristics include eye gaze, facial expression, hand gesture, or a combination thereof.

8. The electronic device of claim 6, wherein the one or more visual characteristics include a gaze direction of the user.

9. The electronic device of claim 1, wherein the rephrased version of the previously provided segment of the audio information does not repeat verbatim the audio information in the previously provided segment.

10. The electronic device of claim 1, wherein stopping the provision of the audio information includes fading out the audio information.

11. The electronic device of claim 1, wherein the received input includes a triggering command.

12. A non-transitory computer-readable storage medium storing one or more programs configured to be executed by one or more processors of an electronic device, the one or more programs including instructions for:
   providing, using a speaker, audio information responsive to received input, wherein the audio information is divided into segments;
   while providing the audio information, detecting one or more conditions for stopping the provision of audio information;
   in response to detecting the one or more conditions for stopping the provision of audio information, stopping the provision of the audio information; and
   after stopping the provision of the audio information and in accordance with a determination that the one or more conditions for stopping the provision of audio information have ceased, providing resumed audio information, wherein the resumed audio information includes a rephrased version of a previously provided segment of the audio information.

13. A method, comprising:
   at an electronic device:
   providing, using a speaker, audio information responsive to received input, wherein the audio information is divided into segments;
   while providing the audio information, detecting one or more conditions for stopping the provision of audio information;
   in response to detecting the one or more conditions for stopping the provision of audio information, stopping the provision of the audio information; and
   after stopping the provision of the audio information and in accordance with a determination that the one or more conditions for stopping the provision of audio information have ceased, providing resumed audio information, wherein the resumed audio information includes a rephrased version of a previously provided segment of the audio information.

14. The non-transitory computer-readable storage medium of claim 12, wherein the one or more conditions for stopping the provision of audio information includes detecting speech from a user.

15. The non-transitory computer-readable storage medium of claim 14, wherein the speech from the user includes a follow-up request associated with the received input.

16. The non-transitory computer-readable storage medium of claim 14, wherein the speech from the user includes speech directed to another person.

17. The non-transitory computer-readable storage medium of claim 14, wherein the speech from the user excludes silencing commands.

18. The non-transitory computer-readable storage medium of claim 14, wherein the determination that the one or more conditions for stopping the provision of audio information have ceased includes a determination that one or more visual characteristics indicate that further speech from the user is not expected.

19. The non-transitory computer-readable storage medium of claim 18, wherein the one or more visual characteristics include eye gaze, facial expression, hand gesture, or a combination thereof.

20. The non-transitory computer-readable storage medium of claim 18, wherein the one or more visual characteristics include a gaze direction of the user.

21. The non-transitory computer-readable storage medium of claim 12, wherein the rephrased version of the previously provided segment of the audio information does not repeat verbatim the audio information in the previously provided segment.

22. The non-transitory computer-readable storage medium of claim 12, wherein stopping the provision of the audio information includes fading out the audio information.

23. The non-transitory computer-readable storage medium of claim 12, wherein the received input includes a triggering command.

24. The method of claim 13, wherein the one or more conditions for stopping the provision of audio information includes detecting speech from a user.

25. The method of claim 24, wherein the speech from the user includes a follow-up request associated with the received input.

26. The method of claim 24, wherein the speech from the user includes speech directed to another person.

27. The method of claim 24, wherein the speech from the user excludes silencing commands.

28. The method of claim 24, wherein the determination that the one or more conditions for stopping the provision of audio information have ceased includes a determination that one or more visual characteristics indicate that further speech from the user is not expected.

29. The method of claim 28, wherein the one or more visual characteristics include eye gaze, facial expression, hand gesture, or a combination thereof.

30. The method of claim 28, wherein the one or more visual characteristics include a gaze direction of the user.

31. The method of claim 13, wherein the rephrased version of the previously provided segment of the audio information does not repeat verbatim the audio information in the previously provided segment.

32. The method of claim 13, wherein stopping the provision of the audio information includes fading out the audio information.

33. The method of claim 13, wherein the received input includes a triggering command.

* * * * *